Patented July 5, 1949

2,475,285

UNITED STATES PATENT OFFICE 2,475,285

METHOD OF PREPARING CHLORINE DIOXIDE

Willis S. Hutchinson, St. Paul, Minn., assignor to Mathieson Chemical Corporation, a corporation of Virginia No Drawing. Application July 12, 1944, Serial No. 544,646

5 Claims. (Cl. 204—164)

This invention relates to the generation of chlorine dioxide and more particularly to an improved process whereby chlorine dioxide, free from elemental chlorine and in safe concentrations, may be economically produced.

Chlorine dioxide has many uses in the industry. For instance, its use has heretofore been proposed in the bleaching of flour. However, because of its unstable character, chlorine dioxide cannot be produced in bulk and stored until needed. Consequently, it is necessary to generate the chlorine dioxide at the place where it is to be used and only in immediately-required quantities.

A further difficulty heretofore experienced has been the necessity of maintaining the chlorine dioxide at a safe concentration throughout the generating and processing operation. It is generally necessary, in order to avoid explosion hazards, to handle chlorine dioxide in a rather high state of dilution with air or some other inert gaseous medium. The handling of chlorine dioxide in concentrations such that the partial pressure of the chlorine dioxide is equal to about 70 millimeters of mercury or higher is usually unsafe. For commercial purposes, for instance in the treatment of flour, the partial pressure of the chlorine dioxide in such chlorine dioxide-air mixtures should not usually exceed about 30 millimeters and, preferably, should be considerably lower. Thus, the adjustment and control of the rate of generation and the concentration of chlorine dioxide in the resultant mixture, so as to avoid hazardous concentrations at any point in the apparatus, is of major importance.

Various reactions are known whereby chlorine dioxide may be generated. For instance, it has heretofore been recognized that chlorine dioxide may be generated by reacting chlorine with a chlorite, sodium chlorite or calcium chlorite, for instance. In such operations, the chlorine in admixture with air is passed in contact with the chlorite, the chlorine reacting with the chlorite to form chlorine dioxide and the air of the chlorine-air mixture serving to dilute the chlorine dioxide as formed to a safe concentration.

Difficulties have heretofore been experienced in operations, such as just described, due to the necessity of avoiding the passage of chlorine in too high a concentration in contact with the chlorite. For instance, should the air supply fail for any reason, and concentrated chlorine be passed to the reaction zone, chlorine dioxide in explosive concentrations will be formed. To avoid the possibility of explosion, it has been necessary carefully to control and regulate the proportions of air and chlorine in the gaseous mixture passed in contact with the chlorite.

In accordance with my present invention, I avoid the handling of elemental chlorine and the only chlorine-containing reactant used in my improved operation is the chlorite. Further, in accordance with an important aspect of my invention, I eliminate the possibility of generating chlorine dioxide in dangerous concentrations and avoid the necessity of measuring and controlling the rate of flow of corrosive gases such as chlorine.

My present invention is based upon my discovery that, if nitrogen peroxide, diluted with air or other inert gas, be brought into contact with a chlorite, such as a chlorite of the alkali or alkaline earth metals, sodium chlorite or calcium chlorite, for instance, the nitrogen peroxide of the mixture will react with the chlorite to form chlorine dioxide. The chlorine dioxide as formed is diluted with the diluent gas present in the nitrogen peroxide mixture and, by using sufficiently dilute mixtures of the nitrogen peroxide, safe concentrations of chlorine dioxide are obtained.

Although I cannot definitely state the exact course of the reaction, it appears to be represented generally by the following equation:

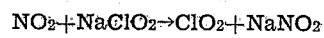

$$NO_2 + NaClO_2 \rightarrow ClO_2 + NaNO_2$$

Thus, for each mole of the nitrogen peroxide, calculated as $NO_2$, reacted with the chlorite, 1 mole of chlorine dioxide will be formed. Therefore, the concentration of chlorine dioxide in the resultant gaseous mixture cannot exceed the concentration of nitrogen peroxide, calculated as $NO_2$, in the reacting gaseous mixture. No elemental chlorine is liberated by the over all reaction and, consequently, chlorine dioxide, uncontaminated by elemental chlorine, is obtained.

The concentration of a chlorine dioxide-air mixture such as previously described, in which the partial pressure of the chlorine dioxide is 70 mm. of mercury, is about 10 mole per cent, and that in which the partial pressure of the chlorine dioxide is 30 mm. is about 4 mole per cent. Consequently, assuming complete reaction of the nitrogen peroxide with the chlorite, chlorine dioxide mixtures in which the partial pressure of the chlorine dioxide is as just indicated may be prepared by passing in contact with the chlorite mixtures of nitrogen peroxide and air, in which the concentration of the nitrogen peroxide is about 10 mole per cent., and about 4 mole per cent., respectively.

Gaseous mixtures of nitrogen peroxide of suitable concentration for my present purpose may be prepared by conventional methods which do not require the handling of corrosive gases or liquids in concentrated form.

The invention has been found particularly applicable to the bleaching of flour or the like, but it will be understood that its application is not so limited.

Nitrogen peroxide has been extensively used in the bleaching of flour and the like, and a convenient and economical source of nitrogen peroxide for such purpose has been generators of the type in which excess air is passed through a disruptive electrical discharge. In passing through the field of the electrical discharge, a portion of the oxygen and nitrogen of the air is converted to nitrogen peroxide or perhaps to NO and subsequently oxidized to nitrogen peroxide by the excess air. A large portion of the air, however, passes through the generator unchanged and the resultant gas is an admixture consisting primarily of nitrogen peroxide, and possibly other oxides of nitrogen, diluted with a substantial proportion of air. In operations of this sort, the maximum concentration of nitrogen peroxide in the effluent gases, calculated as $NO_2$, is about 1% to 2% and, therefore, by using a nitrogen peroxide mixture so prepared, there is no possibility of generating chlorine dioxide in dangerous concentrations.

A satisfactory generator of this type is the apparatus known to the industry as the Alsop generator. As these nitrogen peroxide generators have been used extensively in the industry, they are generally available for purposes of my present invention. Further, they are a convenient and economical source of dilute nitrogen peroxide-inert gas mixtures.

In accordance with my present invention, nitrogen peroxide in admixture with a diluent gas, advantageously the nitrogen peroxide-air mixture from a generator such as the Alsop generator, is brought in contact with the solid chlorite, for instance, in crystalline, granular or flaked form. Advantageously, the gaseous mixture is passed through a bed or column of particles of the chlorite. The amount and concentration of the nitrogen peroxide in the mixture may be controlled within limits by regulation of the rate of operation of the generator but the nitrogen peroxide concentration cannot exceed safe operating limits. The bed or column of the chlorite is with advantage of sufficient depth to afford adequate contact to permit substantially complete reaction of the nitrogen peroxide present with the chlorite. However, where desired, the extent of contact between the gaseous mixture and the chlorite may be so limited as to permit the reaction of only a portion of the nitrogen peroxide with the chlorite, the effluent gases comprising an admixture of chlorine dioxide, nitrogen peroxide and air.

The operation is simple, safe, economical and readily controlled. As previously noted, the concentration of the resultant chlorine dioxide gas cannot exceed the concentration of the nitrogen peroxide in the reacting mixture and, therefore, the possibility of dangerous concentrations of chlorine dioxide is avoided.

Though nitrogen peroxide has been found to be an effective bleaching agent for flour and the like, the effectiveness of an equimolar proportion of chlorine dioxide, based on nitrogen peroxide as $NO_2$, has been found to be much greater. For example, by treating a flour with nitrogen peroxide in proportions equivalent to 1.76 grams of nitrogen peroxide per barrel of flour, the treated flour was found to have a "carotene" content of 1.01 parts per million, a Slick score color of 7-creamy and a bread crumb color of 10-creamy. By passing an equal amount of the nitrogen peroxide-air mixture, i. e., equivalent to 1.76 grams per barrel, through a column of sodium chlorite $1\tfrac{15}{8}$ inches in diameter and 40 inches high and thereafter treating a portion of the same flour with the resultant gas, the treated flour was found to have a "carotene" content of 0.77 part per million, a Slick score color of 10-white and a bread crumb color of 12-white.

The invention may be used with particular advantage in the production of chlorine dioxide mixtures of low concentrations, of the order described as safe for commercial purposes. However, by the use of more concentrated nitrogen peroxide mixtures, more concentrated mixtures of chlorine dioxide may be produced where desirable.

I claim:

1. A process for the production of chlorine dioxide in a state of dilution with an inert diluent gas which comprises reacting gaseous nitrogen peroxide, diluted with such diluent gas to a concentration not greater than about 10 mole percent, with a chlorite of a metal of the class consisting of the alkali and alkaline earth metals.

2. A process for the production of gaseous bleaching agents comprising chlorine dioxide in a state of dilution with air which comprises passing air through the field of a disruptive electrical discharge and passing the resultant gaseous mixture comprising a substantial proportion of nitrogen peroxide in contact with a chlorite of a metal of the class consisting of the alkali and alkaline earth metals.

3. A process for the production of chlorine dioxide in a state of dilution with air, which comprises passing an admixture of nitrogen peroxide diluted with air to a concentration not greater than about 10 mole per cent. in contact with a chlorite of a metal of the class consisting of the alkali and alkaline earth metals.

4. A process for the production of chlorine dioxide in a state of dilution with air which comprises passing an admixture of nitrogen peroxide diluted with air to a concentration not greater than about 4 mole per cent. in contact with a chlorite of a metal of the class consisting of the alkali and alkaline earth metals.

5. A process for generating chlorine dioxide in controlled concentration in admixture with a inert diluent gas which comprises introducing a gaseous charge comprising nitrogen peroxide diluted with said diluent gas into a reaction zone, and producing the chlorine dioxide in admixture with said diluent gas by reacting the nitrogen peroxide in said zone with a chlorite of a metal of the class consisting of the alkali and alkaline earth metals whereby the nitrogen peroxide is converted on an equimolar basis to chlorine dioxide in admixture with said diluent gas, the molar concentration of the nitrogen peroxide in said gaseous charge to the reaction zone not exceeding about 10 mole percent.

WILLIS S. HUTCHINSON.

REFERENCES CITED

The following references are of record in the file of this patent:

Frankland et al., Journal of the Chemical Society (British), vol. 79 (1901), pp. 1356–1373.

Certificate of Correction

Patent No. 2,475,285 July 5, 1949

WILLIS S. HUTCHINSON

It is hereby certified that error appears in the printed specification of the above numbered patent requiring correction as follows:

Column 4, line 8, for "1 １⅝₆ inches" read *1 ⅝₆ inches*;

and that the said Letters Patent should be read with this correction therein that the same may conform to the record of the case in the Patent Office.

Signed and sealed this 13th day of December, A. D. 1949.

[SEAL]

THOMAS F. MURPHY,
*Assistant Commissioner of Patents.*